United States Patent [19]

Smith

[11] Patent Number: 4,629,559
[45] Date of Patent: Dec. 16, 1986

[54] VERTICAL LOOPED REACTOR TANK WITH DELAYED AIR RELEASE FEATURE

[75] Inventor: George W. Smith, Mukwonago, Wis.

[73] Assignee: Envirex Inc., Waukesha, Wis.

[21] Appl. No.: 743,847

[22] Filed: Jun. 12, 1985

[51] Int. Cl.⁴ .............................................. C02F 3/12
[52] U.S. Cl. ................................... 210/150; 210/220; 261/123
[58] Field of Search ............... 210/619, 629, 150, 151, 210/220, 199; 261/123

[56] References Cited

U.S. PATENT DOCUMENTS

| 3,101,321 | 8/1963 | Austin et al. | 210/151 |
| 3,642,615 | 2/1972 | Wieferig | 210/151 X |
| 3,703,462 | 11/1972 | Smith | 210/629 X |
| 3,776,841 | 12/1973 | Torpey | 210/619 |

Primary Examiner—Tom Wyse
Attorney, Agent, or Firm—Lawrence J. Crain

[57] ABSTRACT

An apparatus for use in an activated sludge process for treating wastewater wherein raw sewage or the like is mixed with activated sludge and the resulting mixture is circulated in a confined aerated tank (usually in the form of additional subsurface aeration) so that the mixture follows a predetermined vertical flow cycle through a plurality of flow passageways created by gas impermeable baffle means in order to optimally increase the retention time of aerating air in the tank. The retention time of the air is increased by means of at least one secondary horizontal baffle means specifically designed to collect large bubbles of air trapped beneath said gas-impermeable baffle means and to be permeable to gases, so as to provide additional air/liquid surface area to escaping air. The secondary baffle is situated adjacently above and substantially parallel to the gas impermeable flow directing baffle means.

18 Claims, 4 Drawing Figures

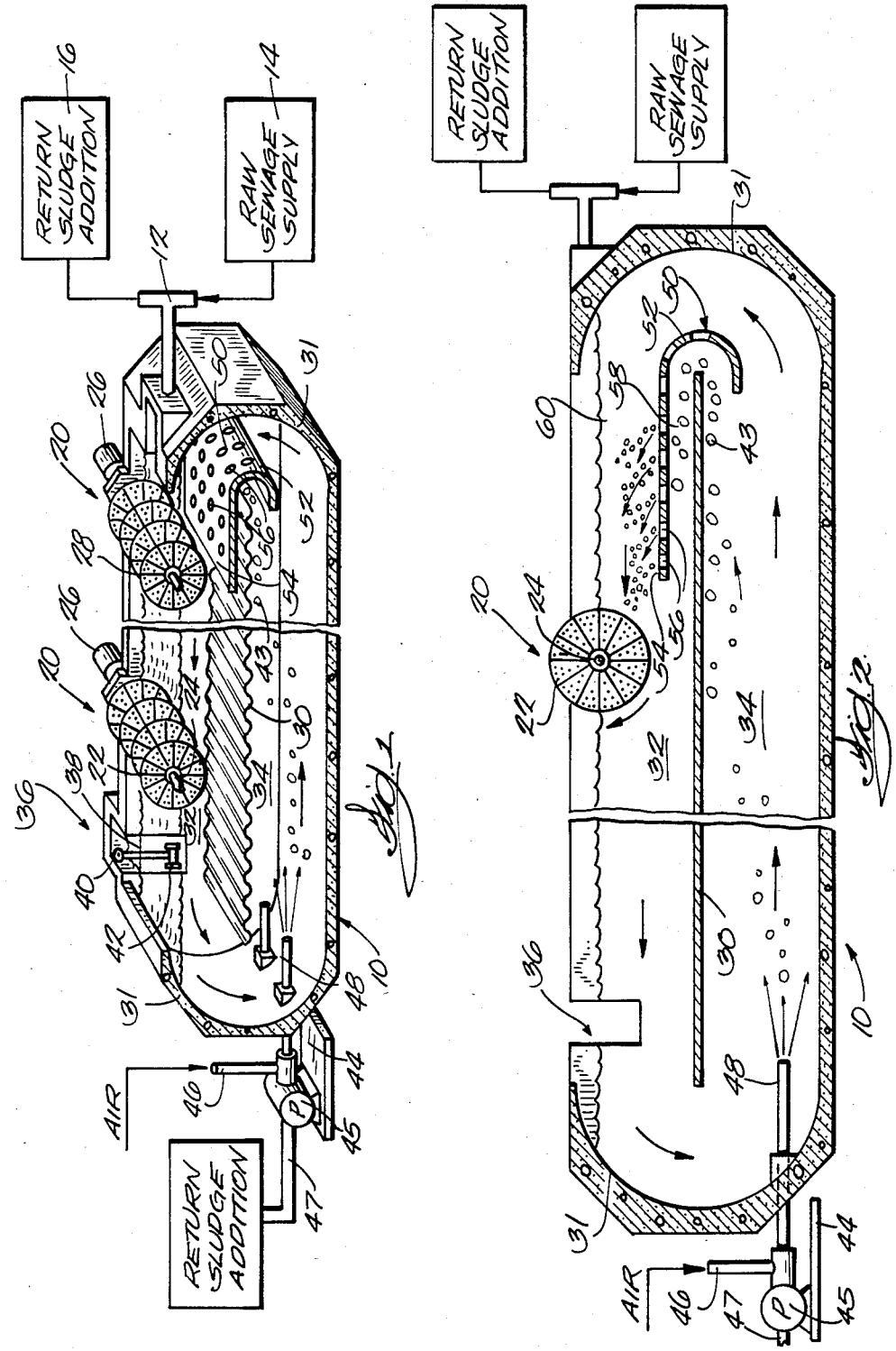

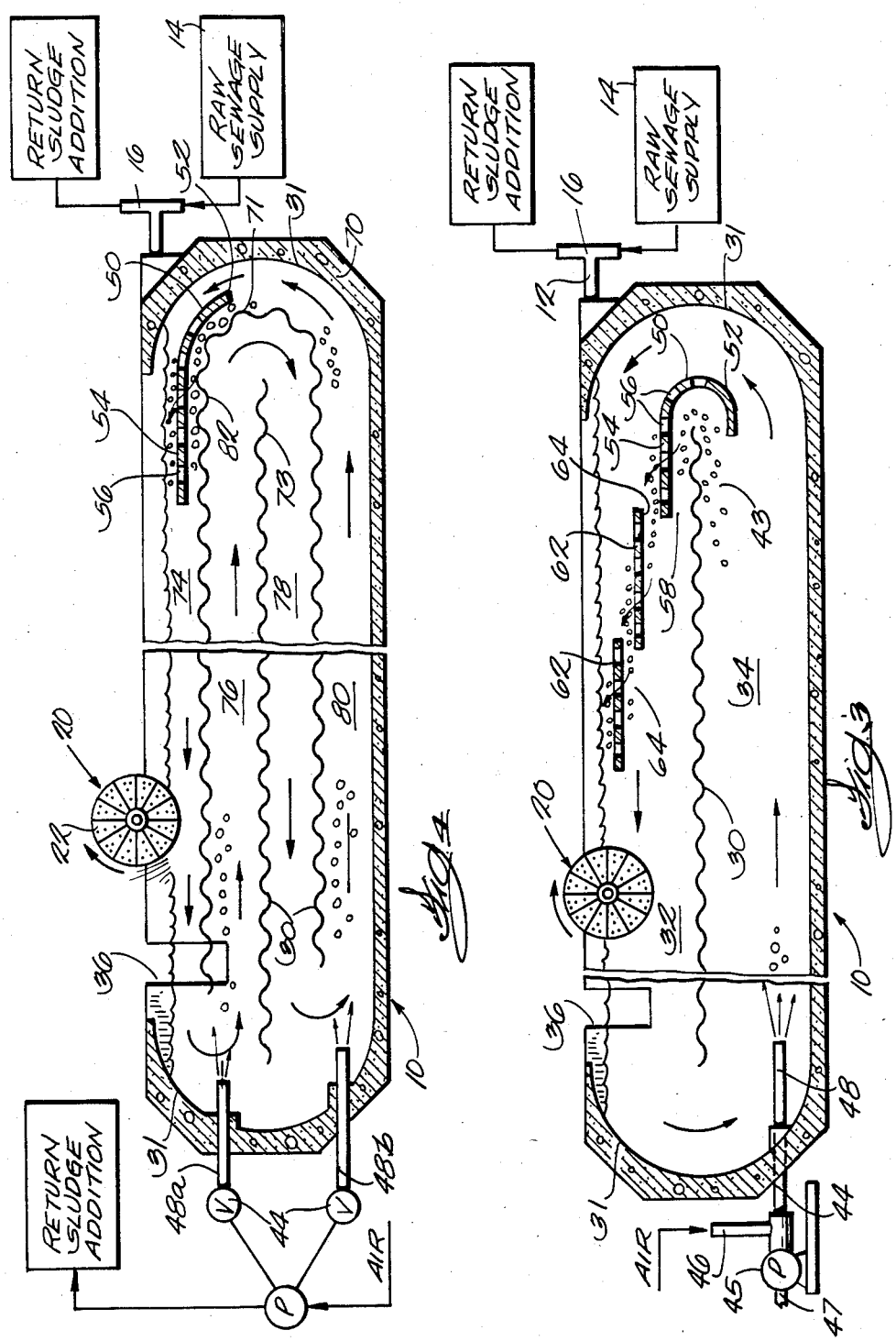

VERTICAL LOOPED REACTOR TANK WITH DELAYED AIR RELEASE FEATURE

BACKGROUND OF THE INVENTION

The present invention relates to an apparatus used in conjunction with a wastewater treatment process involving the recycling of activated sludge into raw or partially treated wastewater to catalyze the degradation of organic compounds by aerobic microorganisms. More particularly, the present invention relates to an apparatus which optimizes the amount of oxygen available to microorganisms, allowing them to more effectively metabolize organic waste compounds.

The recycling of sludge containing "waste eating" bacteria and other organisms (activated sludge) into raw sewage or partially treated wastewater is well known in the art. Generally, wastewater is directed into a shallow confines area, such as a tank or ditch with a large surface area exposed to the air to promote the growth of bacteria and other microorganisms which feed on organic waste. The wastewater is allowed to commingle with the air and means are often provided to increease the air/wastewater interface to enhance the organic decomposition of suspended wastes. Supplemental agitation means are also used to maintain solid waste material in a suspended state as long as possible. Examples of aeration devices include forced air sparger jets located under the surface of the water, and mechanical mixing devices such as paddles, rollers, disks or brushes mounted above the surface of the wastewater and extending into said wastewater to cause agitation.

Secondary sludge aeration devices presently in use contain many disadvantages, among them the excessive consumption of power to run the jet aerators as well as the mechanical devices, and the requirement for relatively large areas of land to provide tanks with sufficient surface area.

U.S. Pat. No. 3,703,462 to Smith discloses an attempt to overcome some of these drawbacks, comprising the method of circulating a sewage liquor/air mixture through a hydraulic vertical flow circuit in a manner designed to prevent the escape of substantial amounts of air from such mixture for a major portion of the flow circuit.

A preferred embodiment of the apparatus disclosed by Smith to effectuate his method comprises a generally rectangular tank of considerable depth having gas impermeable baffle-like members positioned below the normal liquid surface to define a plurality of flow passageways therein. Various aeration mechanisms are positioned in one or more of such passageways to introduce air and flow energy to the wastewater within the apparatus.

The baffle-like members delay the escape of air within the passageways, thus allowing increased utilization of oxygen by the aerobic organisms. This more efficient use of oxygen significantly reduces the cost of this activated sludge phase of the waster treatment process. However, a major drawback of the device disclosed by the Smith patent is that air is released from beneath the baffle in a narrow band of bubbles which rapidly migrates to the surface. The emission of entrapped air in this narrow band of bubbles means that the air is not retained for a sufficient duration to maximize the utilization of available oxygen by the wastewater biota. A further drawback of the Smith device is that the air is released in a zone where the hydraulic flow is vertical, and acts to speed the upward migration of released air bubbles.

Thus, it is a major objective of the present invention to provide a secondary wastewater treatment apparatus which allows wastewater biota to make maximum use of available oxygen.

It is a further objective of the present invention to provide an activated sludge wastewater treatment apparatus wherein the retention time of supplemental oxygen is increased over conventional models.

It is a still further objective of the present invention to provide an activated sludge wastewater treatment apparatus wherein the supplemental oxygen is dispersed throughout a wastewater tank in a physical format which maximizes its utilization by treating biota.

SUMMARY OF THE INVENTION

The invention generally provides an apparatus for use in an activated sludge process for treating wastewater whereby the contact between the air, the waste liquid and the wastedigesting microorganisms in the waste treatment container is significantly increased by delaying the escape of the air from the container.

More specifically, the present invention is an improvement to a generally rectangular tank of considerable depth having baffle-like members positioned below the normal liquid surface to define a plurality of gas impermeable flow passageways with various submerged aeration mechanisms positioned in one or more of such passageways introducing air and flow energy to the wastewater within the tank. In order to further delay the escape of oxygen from the tank and to maximize its utilization by the tanks's biota, the improvement comprises supplemental air release baffle means designed to capture large air bubbles retained by said flow directing gas impermeable baffles and prevent their ready escape to the top of said tank while increasing their surface area to facilitate the absorption of oxygen contained therein by microorganisms.

BRIEF DESCRIPTION OF THE DRAWINGS

The present invention and its many attendant objects and advantages will become better understood by reference to the following drawings, wherein:

FIG. 1 is a side perspective elevation, in partial section, of a vertical looped reactor of the present invention;

FIG. 2 is a side view in section of the secondary baffle means of the present invention showing the flow of air in the preferred embodiment;

FIG. 3 is a side elevation in partial section of an alternate embodiment of the present invention having a plurality of staggered controlled air release baffles; and FIG. 4 is a side elevation in partial section of an alternate embodiment of a vertical looped reactor comprising the use of a plurality of gas impermeable flow directing baffles.

DESCRIPTION OF THE PREFERRED EMBODIMENT

Referring now to the drawings, wherein like reference characerics designate identical or corresponding parts, FIG. 1 depicts a relatively deep wastewater confining means or tank 10 composed of a suitable material such as concrete, synthetic resin, steel, etc. The tank 10 is generally of rectangular shape and of any desired size to hold a desired volume of liquid, the major or longer axis of such tank can vary in length up to about 100–200 feet, while the width may vary from about 50–100 feet. The tank is constructed to have a liquid depth of about 10–25 feet.

Raw sewage enters tank 10 through influent conduit 12 from a raw sewage supply 14. Influent conduit 12 is also provided with a connection for the addition of return sludge 16 so that the sludge which contains beneficial microorganisms is mixed with raw sewage just prior to entering tank 10. In this manner, the population of biota in tank 10 is maintained.

The mixed sewage is then aerated, as by mechanical aeration means 20 so that air bubbles or the like are introduced into the sewage in the upper layer of the tank. Aeration means 20 comprises a plurality of disks 22 mounted on a common axle 24 oriented on a transverse axis to the flow of sewage and designed to rotate so as to be at least partially in contact with the mixed sewage entering tank 10 via influent conduit 12.

The axle 24 is operationally connected to a drive means 26 such as an electric motor. The disks 22 are provided with a plurality of fine perforations and depressions 28 which function not only to carry air bubbles into and below the surface of the sewage liquor but also to trap subsurface liquid therein and carry drops thereof upwardly into contact with the ambient air. As shown, a plurality of mechanical aeration means 20 and the speed of rotation may be varied to suit the operational conditions of the tank 10 and the incoming sewage. The mechanical aeration means 20 thus introduces air below the surface of the liquid in tank 10 and provides surface energy through flow agitation of the sewage to prevent settling out of sewage solids.

A baffle-like member 30 is mounted within the tank below the normal liquid level approximately horizontally dividing the interior of tank 10 into a plurality of equal volume flow passageways in the preferred embodiment comprising an upper flow passageway 32 and a lower flow passageway 34. As will be shown below in FIG. 4, more than two flow passageways may be provided without deviating from the spirit of the invention. The baffle-like member 30 is gas-impermeable and may be composed of any rigid material such as metal or synthetic resin, but corrosion resistant characteristics are preferred. The baffle member may be formed in corrugated fashion, as shown, or in other fashion to increase its strength. The corrugation performs the additional function of preventing air bubbles from forming a film or otherwise congregating underneath the baffle-like member 30.

Mixed sewage flowing into tank 10 through influent conduit 12 is immediately mixed with the contents of tank 10 and with air by means of mechanical aerator means 20. The aeration means 20 functions generally in a plane parallel to the direction of flow and introduces air and flow energy into the sewage.

More specifically, mechanical aerators 20 perform the dual function of mixing air into the mixed sewage by drawing oxygen depleted sewage into the air and by pulling air into the wastewater. Mechanical aerators 20 also create a tank flow pattern in flow passageways 32 and 34 of an adequate velocity necessary to maintain the waste solids in a suspended condition. The waste solids must remain suspended as long as possible to enable the microscopic biota to optimally encounter and digest the organic waste compounds.

This directional flow created by mechanical aerating means 20 is aided by the geometry of the inner tank surface with its curved end walls 31, and travels along the entire length of the upper flow passageways 32 into the lower flow passageway 34 and then back into the upper flow passageway 32.

The flow of wastewater carries air in the form of trapped bubbles along this cyclical path from the upper to the lower flow passageway, where the oxygen component of the air is dissolved within the sewage liquors and is depleted by the active organisms contained in the water. The nature of the flow cycle is such that as a particular portion of liquid wastewater travels through the upper and lower passageways 32 and 34, it will be gradually depleted of its supply of oxygen from the point at which it leaves the mechanical aerator 20, until it encounters another aerator or returns to the starting point. The oxygen depleted nature of the wastewater as it encounters the aerator 20 significantly increases the efficiency of the device by facilitating the absorption of oxygen.

The circulation is maintained for a period of time sufficient for at least a substantial portion of the raw sewage to be processed. Effluent leaves the tank 10 by way of a suitable outlet means 36, which includes a weir or dam means 38 and a submerged conduit 40 having a control means 42 which is automatically or manually activated. The effluent proceeds from the outlet means 36 to a final clarifier (not shown) wherein sludge is removed for ultimate disposal and/or recycling by mixing with fresh raw sewage. The remaining effluent is clarified and otherwise treated to yield useful water which can be discharged into streams or the like.

In conventional devices, the biological absorption of oxygen from air bubbles is not completed by the time a particular flow segment reaches the lower flow passageway 34. Thus, the liquid flow contains a substantial complement of trapped bubbles at this point. This fact, in conjunction with the natural tendency for air bubbles submerged in water to rise to the surface of this water, and the flow dynamics of the tank 10, allows for the accumulation of large bubbles of air 43 on the underside of the baffle-like members 30.

Since the surface tension of the underside of baffle-like member 30 slows the flow of a boundary layer of wastewater in tank 10, air bubbles can accumulate underneath the surface of baffle-like member 30 until a bubble(s) is formed 43 which is large enough to be wisked into the flowing sewage. When these large bubbles reach the end of baffle-like member 30, they rise in a narrow band very quickly to the surface of the liquid in tank 10, thus allowing a substantial quantity of oxygen to escape from the tank unutilized. Furthermore, the position of the standard baffle 30 is such that the large bubbles are released into a zone of substantially vertical flow, which accelerates their migration to the surface of the tank.

This problem is compounded when supplemental aeration means are introduced into tank 10 in the form of sub-surface aeration means 44 comprised of a pump 45 provided with a pair of intake conduits, one of which takes in air 46 and the other which is connected to a return sludge addition means 47. The air-return sludge mixture is passed through pump 45 and is injected into circulating sewage liquor within tank 10 through a plurality of open-ended jet-sparge tubes 48, which direct air flow into the lower flow passageway 34. The jet-sparge tubes impart both additional velocity to sludge flow as well as additional air to the sewage.

To alleviate this problem of underutilization of oxygen, it is necessary to delay the escape of air bubbles from the tank 10 after they reach the end of baffle-like member 30, so that the oxygen may be more readily absorbed by the microorganisms. It is also desirable to increase the air to water surface area of the relatively large, accumulated bubbles by fragmenting them into a plurality of smaller bubbles.

This problem of the underutilization of oxygen is addressed in the present invention by the provision of a secondary gas permeable baffle 50, attached to the sides of tank 10. Secondary baffle 50 is comprised of a curved gas capture portion 52 and a substantially horizontal gas release portion 54 having a plurality of randomly spaced gas release apertures 56. The secondary baffle 50 is positioned in the tank 10 above baffle-like member 30 to create a narrow chamber 58, said chamber having a height on the order of 1–2 feet. Secondary baffle 50 is further positioned in tank 10 near the end of baffle-like member 30 so that the curved gas capture portion 52 can intercept the large bubbles 43 as they escape from underneath baffle-like member 30.

The large bubbles 43 then flow into narrow chamber 58, where their natural tendency to rise to the surface forces them through the smaller gas release apertures 56. The gas release apertures 56 are constructed and arranged to create small bubbles 60 of the approximate size of bubbles emitted from a coarse bubble diffuser device which is standard in the industry, or on the order of $\frac{1}{4}$–178 inch in diameter. This creation of a plurality of small bubbles 60 from the large bubbles 43 in chamber 58 significantly increases the oxygen transfer efficiency of the system by providing additional air/liquid surface area.

In the preferred embodiment, gas release portion 54 is oriented substantially parallel with baffle-like member 30 and extends longitudinally away from the gas capture portion approximately 15–30% of the length of baffle-like member 30. The exact position of secondary baffle 50 may vary as long as its air capture function is not impaired and the flow of sewage liquor in flow passageway 32 is not impeded. Small bubbles 60 are released into the upper flow passageway 32 on an angular trajectory as they are carried into the moving flow of wastewater.

FIG. 3 depicts an alternative embodiment of the present invention in which at least one additional gas permeable air release baffle 62 is located in the upper flow passageway of tank 10. Air release baffle 62 comprises a substantially flat piece of rigid material having a plurality of randomly arranged gas release apertures 56 similar in size to the apertures found in secondary baffle 50. Additional air release baffle 62 is placed above and downstream of secondary baffle 50 so as to further intercept the small air bubbles 60 in their path to the surface of the liquid in tank 10.

In this manner, submerged air bubbles may be depleted of substantially all available oxygen by floating biota before their escape from tank 10. Depending on the amount of oxygen recapture desired, the length of the tank and the amount and cost of power necessary to create flow velocities, additional air release baffles 62 may be positioned in a stepped and staggered sequence in a downstream direction, creating a plurality of bubble detention zones 64. Additional air release baffles 62 may be added as long as the flow velocity in the upper flow passageway 32 is not significantly impeded. Eventually, however, the maximum amount of additional air release baffles 62 would be controlled by the law of diminishing returns, as more baffles would create more of a drag on flow velocity than would be tolerable in view of the minimal amount of additional oxygen recovered by those baffles.

An alternate embodiment 70 of the apparatus constructed and operated in accordance with the principle of the invention is depicted in FIG. 4. The tank 10 is similar to that previously described, being of rectangular configuration and constructed of concrete or other suitable material and capable of containing a given volume of liquid. The interior of tank 10 is divided into a plurality of flow passageways 74, 76, 78 and 80 by suitable gas impermeable baffle-like means 30 comprised of an outer baffle means 71 and an inner baffle means 73. The flow passageways 74, 76, 78 and 80 are serially connected for fluid flow and to guide liquid along one passageway and then along another passageway without allowing the liquids to intermix within the various passageways or allowing blind or dead spots to occur within such passageways.

The tank 10 is provided with a suitable fluid influent conduit 12 connected to a raw sewage supply 14 and a connection for the addition of return sludge 16 so that raw sewage and return sludge are intermixed with each other as they enter the tank 10 so that mixed sewage liquor is circulated within the tank and through the various flow passageways described.

The baffle-like member 30 is mounted within the tank 10 below the normal liquid level so as to divide the interior of the tank into a plurality of flow passageways of approximately equal volume. Generally, each passageway extends in depth to approximately 6–12 feet. The baffle-like member 30 is mounted along portions of the tank 10 so that the sewage liquor can only flow around the ends thereof in a predetermined vertical orbital circuit so that each segment of sewage liquor passes through all of the flow passageways.

As was described above in relation to FIG. 1, mechanical aeration means 20 are mounted along the upper surface of tank 10 in such a way as to come into contact with the sewage liquor flowing within the uppermost flow passageway 74. The aeration means 20 are generally comprised of rotary devices 22 suitably mounted for rotation in the direction indicated. The mechanical aeration means 20 aerates the sewage liquor by drawing droplets into the air for aeration, as well as pulling air into the moving sewage liquid. A second function performed by the aeration means 20 is the creation of a liquid flow velocity adequate to maintain solid matter in suspension.

As the sewage liquor reaches the end of flow passageway 74, it encounters the curved end wall 31 of tank 10 and is forced downwardly into flow passageway 76. An additional subsurface aeration means 44, here comprising a jet-sparge device 48a positioned to discharge air and/or return sludge into passageway 76, imparting additional air and flow velocity therein. A valve V is provide to regulate the amount of air and/or air-return sludge mixture added by the jet-sparge means 48a and 48b.

The sewage liquor continues to flow along passageway 76 in the directions indicated by the arrows until it reaches the far end thereof and encounters curved end wall 82 of the outer baffle-like member 71, which causes it to flow downwardly and into flow passageway 78. As will be appreciated, the plurality of jet-sparge tubes 48a can be provided as an array along the entrance of flow passageway 76 to provide adequate air and flow velocity to maintain both the biological decomposition process and the suspended nature of waste solids as the liquor flows through passageways 76 and 78.

As the sewage liquor reaches the end of flow passageway 78 is again encounters curved end wall 31 of tank 10 and is forced downwardly into flow passageway 80. An additional array of jet-sparge tubes 48b are provided along the entrance of flow passageway 80 so that additional air and energy can be imparted to the circulating sewage liquor. This circulating system is maintained for a period of time sufficient to treat at least a substantial portion of the initially supplied raw sewage and thereafter the outlet means 36 is activated so that a regulated amount of the treated effluent is removed as described hereinbefore.

In order to further increase the residence time of air bubbles within tank 10 of embodiment 70 and to enable the maximum utilization of available oxygen, a secondary gas permeable baffle 50 is provided which will cause the air bubbles to be released in a wide band into a generally horizontal flow. Secondary baffle 50 is comprised of rigid material having a generally horizontally flattened air release portion 54 and a curved air capture portion 52 constructed and arranged so that secondary baffle 50 appears "J"-shaped in cross-section. Air release portion 54 is provided with a plurality of randomly spaced air release apertures 56 each having a diameter on the order of ¼-½ inch.

In alternate embodiment 70, secondary baffle 50 is oriented so that its longitudinal axis is substantially parallel with the uppermost margin of baffle-like member 30, although the exact position of secondary baffle 50 may vary so long as accumulated bubbles 43 are effectively captured and the flow of sewage liquor in the passageway 74 is not significantly impeded. The position of secondary baffle 50 above the uppermost margin of baffle-like member 30 is such that a narrow chamber 58 is created, having a height on the order of 1-2 feet. Secondary baffle 50 is further positioned in a lateral direction so that the curved air capture portion 52 is oriented to intercept large air bubbles 43 trapped under baffle-like member 30 as they rise to the surface. The large air bubbles 43 are fragmented and released in a wide band into a region of tank 10 having a generally horizontal flow pattern. In the alternate embodiment 70, the operation of secondary baffle 50 is substantially similar to its operation in the preferred embodiment discussed previously.

Thus, the present invention discloses a vertical looped reactor tank for the treatment of wastewater comprising a tank having an interim chamber capable of containing a given liquid level, a gas-impermeable baffle means positioned within the interior chamber and below the normal liquid level so as to define a plurality of longitudinally extending flow passageways, means supplying sewage to the interior chamber, aeration means positioned within at least one of the flow passageways for introducing air and flow-inducing energy to the sewage for circulating the air-sewage mixture through the plurality of flow passagways, and at least one secondary gas permeable air release baffle constructed and arranged to delay the escape of air bubbles from the sewage liquor until substantially all of the available oxygen can be absorbed by sewage decomposing biota.

While particular embodiments of the vertical looped reactor tank have been shown and described, it will be obvious to persons skilled in the art that changes and modifications might be made without departing from the invention in its broader aspects.

What is claimed is:

1. In an activated sludge wastewater treatment apparatus comprising:

an elongated confining means having end walls comprised of a sewage inlet end and a sewage outflow end, side walls, and an interior chamber capable of containing a given liquid level;

horizontally disposed gas-impermeable first baffle means substantially coextensive with said confining means, yet spaced apart from the end walls thereof to provide flow passages between said baffle means and end walls; said first baffle means being positioned within said interior chamber below said liquid level;

said confining means and said first baffle means defining a plurality of serially interconnecting passageways that establish an elongated endless vertical flow circuit for providing complete mixing of sewage matter within said confining means;

means applying raw sewage and recycled sludge to said interior chamber, said recycled sludge supplying a population of microscopic biota to said circulating liquid in said chamber;

an aeration means positioned in at least one of said passageways for introducing air and flow-inducing energy to sewage matter within said interior chamber; and means for removing treated sewage from said interior chamber;

wherein the improvement comprises at least one secondary horizontally-disposed, gas permeable baffle means substantially coextensive with said side walls of said confining means and constructed and arranged near said sewage inlet end between said first baffle means and the surface of said liquid in said confining means to capture air bubbles retained by said first baffle means, and delay the escape of said bubbles to said surface of said liquid by fragmenting said bubbles to increase their absorption into the liquid and eventual metabolism by said circulating biota.

2. The sewage treatment apparatus defined in claim 1 wherein said second horizontal baffle means has an air release portion and an air capture portion.

3. The sewage treatment apparatus defined in claim 2 wherein said air capture portion of said second baffle means is curved so that said baffle means appears "J"-shaped in cross-section.

4. The sewage treatment apparatus defined in claim 3 wherein the longitudinal axis of said second horizontal baffle is oriented substantially parallel to said first horizontal baffle.

5. The sewage treatment apparatus defined in claim 2 wherein the air capture portion of said second horizontal baffle is adjacent to the sewage inlet end of said first horizontal baffle.

6. The sewage treatment apparatus defined in claim 5 wherein said air capture end of said second horizontal baffle is constructed and arranged to extend around and below the sewage inlet end of said first horizontal baffle.

7. The sewage treatment apparatus defined in claim 1 wherein said second horizontal baffle is mounted in said confining means a relatively short distance above said first baffle.

8. The sewage treatment apparatus defined in claim 7 wherein said second horizontal baffle is mounted in said confining means between 1 and 2 feet above said first horizontal baffle.

9. The sewage treatment apparatus defined in claim 1 wherein said second horizontal baffle is shorter in length than said first horizontal baffle.

10. The sewage treatment apparatus defined in claim 9 wherein said second horizontal baffle is on the order of 15-30% of the length of said first horizontal baffle.

11. The sewage treatment apparatus defined in claim 1 wherein said second horizontal baffle is constructed of polymeric material.

12. The sewage treatment apparatus defined in claim 1 wherein the surface of said second horizontal baffle is comprised of a plurality of small apertures.

13. The sewage treatment apparatus defined in claim 12 wherein the surface of said second horizontal baffle is comprised of a plurality of randomly spaced apertures.

14. The sewage treatment apparatus defined in claim 13 wherein said randomly spaced apertures are one-half inch in diameter or smaller.

15. The sewage treatment apparatus defined in claim 1 comprising at least one supplemental gas permeable air release baffle oriented above and downstream of said second horizontal baffle.

16. The sewage treatment apparatus defined in claim 15 wherein said supplemental air release baffle is provided with a plurality of randomly spaced apertures.

17. The sewage treatment apparatus defined in claim 16 wherein said apertures are on the order of $\frac{1}{2}$ in diameter or smaller.

18. The sewage treatment apparatus defined in claim 15 wherein said supplmental air release baffle is constructed and arranged to further delay the escape of air bubbles from said tank until substantially all of the available oxygen has been absorbed by microorganisms in the sewage tank.

* * * * *